Jan. 7, 1936.     A. A. KIRLEY     2,026,686
BOLT
Filed June 30, 1934
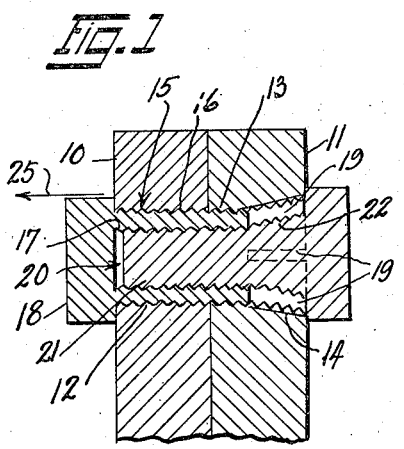
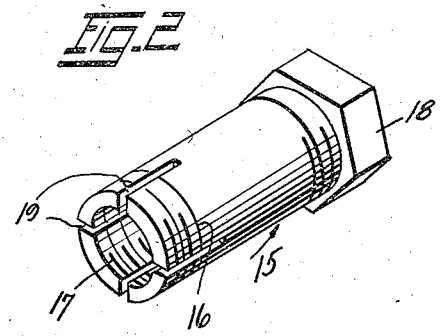
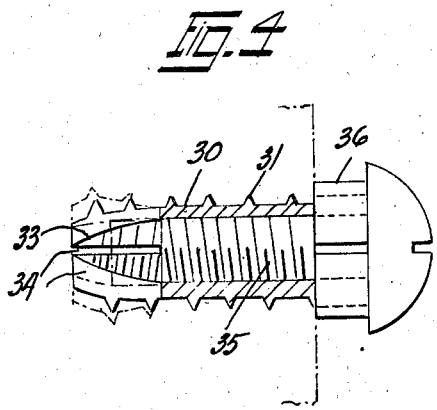
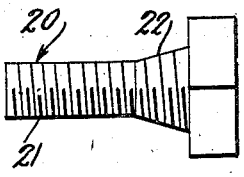
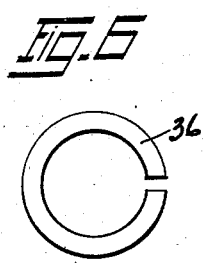
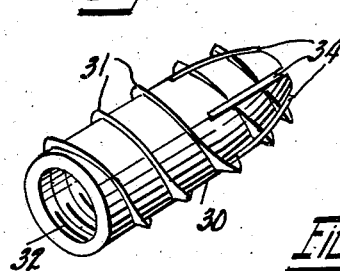
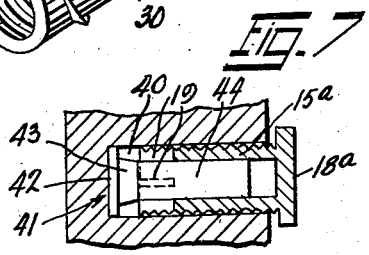
INVENTOR
Arthur A. Kirley
BY
ATTORNEY Patented Jan. 7, 1936

2,026,686

UNITED STATES PATENT OFFICE 2,026,686

BOLT

Arthur A. Kirley, New York, N. Y.

Application June 30, 1934, Serial No. 733,220

1 Claim. (Cl. 85—2.4)

This invention relates to screws or bolts which when screwed into place will not work loose due to vibration or other strains to which they may be subjected to.

One object of the invention is to provide such a screw or bolt comprising a shell having a split end, an outer and an inner thread, the outer thread being utilized for screwing the shell into place, and the inner thread being utilized for engagement with the threads of an auxiliary screw or bolt, the said inner bolt having means thereon for expanding the split end of the shell and forming a wedge to prevent the shell from becoming loose.

Another object of the invention is the provision of a bolt of the character described which will be self locking when any stress or strain is placed thereon.

A further object of the invention is the provision of such a screw which is adaptable for use in ship construction or other structural steel work, and equally adaptable for use in all places wherever large or small screws are needed.

A still further object of the invention is to provide such a screw which is adapted to be used in place of rivets and thus eliminate a great amount of labor entailed in the riveting process as applied to structural steel work, and also to eliminate the machinery used during such riveting operations.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a sectional view through a pair of plates showing my improved bolt as applied thereto.

Figure 2 is a perspective view of the bolt shell.

Figure 3 is a side view of the auixilary or inner bolt.

Figure 4 is a sectional view of a modified form of my invention.

Figure 5 is a perspective view of the threaded shell forming a part of the said modified form of the invention.

Figure 6 is an end view of the temporary collar used in connection therewith, and Figure 7 is a longitudinal sectional view of a modified form of the invention.

Referring now to Figures 1 to 3 of the drawing in detail 10 and 11 denote a pair of metal plates, the plate 10 being provided with a threaded opening 12 and the plate 11 with a similar opening 13 provided at one end thereof with a countersink 14.

The said plates 10 and 11 are screwed together by a multiplicity of bolts, one of which is shown in Figure 1, each bolt comprising a shell 15 having an outer screw thread 16 and an inner thread 17. The said shell is provided at one end thereof with a head 18 and at its opposite end with a multiplicity of slots 19 extending part way of the length of the said shell. The shell 15 is first screwed into place through the threaded openings 12 and 13 and then an auxiliary bolt or screw 20 having a threaded shank 21 is screwed into the threaded interior of the said shell 15. As the said screw is being screwed home, a tapered and threaded portion 22 thereon spreads the slotted end of the shell 15 into the countersink 14 of the hole 13 in the plate 11.

It will be seen from the foregoing description that the hollow bolt or shell 15 cannot become loose and work its way out of the plates 10 and 11 as it is tightly held in place by the wedge formed by the split end thereof. It will also be seen that the screw 20 cannot become loose and work its way out, as any stress on the shell 15 tending to draw same out of the plates in the direction of the arrow 25 will cause the split end of the shell to grip the tapered portion 22 even more tightly than before, thus preventing any loosening of the said screw 20.

While I have shown my improved bolt of a size large enough to be used in structural steel work, and in place of rivets commonly used for such purposes, I desire it understood that the said bolt may be made of a very small size and used as for small work as for instance eye glass mountings, etc.

The form of my invention shown in Figures 4 to 6 comprises a shell 30 having an outer wood screw thread 31 and an inner opening or bore provided with machine or metal thread 32. The inner threaded opening is tapered at one end thereof as at 33 and the said shell is provided with slots 34 at the said end. Fitting into the threaded opening is a screw 35 which normally has a split spacing washer 36 thereon. In practice, the entire structure is screwed into place that is, the screw 35 with the shell 30 and washer 36 held between the head of the screw and unsplit shell end is screwed as a unit into an opening until the washer contacts the wall and then the screw 35 is slightly loosened or unscrewed after which the washer or collar is snapped off and the screw is entirely screwed into the shell, the end of the screw causing the spit end of the shell to expand as shown in dot and dash lines, Figure 4, thus wedging the shell in place and preventing same from becoming loose.

It will be seen by referring to Fig. 4 that the length of the screw 35 is no longer than the combined length of the unsplit portion of the shell 30 and the length of the washer 36. Due to this fact and to the inner taper of the shell the end of the screw 35 will expand the split end of the shell after the split washer is removed and the screw is driven home.

In Figure 7 I have shown a form of my invention adapted for use in connection with marble or masonry work, wherein a hole 40 is provided in the said marble or masonry and the bolt structure is inserted into the said opening. It will be noted that in this form of the invention, I use an inner threadless stud 41 having a head 42 and a tapered portion 43 intermediate the said head and the shank 44 thereof. The outer shell 15a is the same in all respects as the shell 15 with the exception that the inner bore thereof is threadless.

With the bolt structure fully within the hole 40 and the head 41 against the bottom of the hole, the head 18a of the shell 15a is struck with a hammer or other tool causing the inner split portion of the shell to ride up on the tapered portion 43 of the inner stud and become expanded and wedged in the said opening or hole 40.

From the foregoing, it will be seen that I have provided a simple yet efficient bolt that will stay put after it has once been screwed into place and the use of which will eliminate a great deal of labor and machinery when used in place of rivets, as riveting is a three man job while the bolting operation using my improved bolts is but a one man job.

Having described my invention what I claim as new and desire to secure by Letters Patent is:

A bolt of the nature described, comprising a shell having an outer wood screw thread and an inner machine screw thread, a split portion at one end of the said shell, the inner walls of the said shell being tapered at the said end, a screw adapted to enter the shell from the opposite end, and engage the inner thread, and a split washer on the screw abutting the unsplit shell end and the screw head for the purpose specified, the length of the screw being no longer than the combined length of the unsplit portion of the shell and the length of the washer.

ARTHUR A. KIRLEY.